May 29, 1962 S. BERGER ET AL 3,037,088

TAPE RECORDER TRANSPORT

Filed Jan. 6, 1961 5 Sheets-Sheet 1

*INVENTORS.*
Leonard Rosenblatt
Stanley Berger
*BY* Maxwell E. Sparrow

*ATTORNEY.*

INVENTORS.
Leonard Rosenblatt.
Stanley Berger
BY Maxwell E. Sparrow
ATTORNEY.

*INVENTORS.*
Leonard Rosenblatt
Stanley Berger.
*BY*
Maxwell E. Sparrow.
ATTORNEY.

*INVENTORS:*
Leonard Rosenblatt
Stanley Berger.
*BY* Maxwell E. Sparrow.
*ATTORNEY.*

May 29, 1962 S. BERGER ET AL 3,037,088

TAPE RECORDER TRANSPORT

Filed Jan. 6, 1961

5 Sheets-Sheet 5

*INVENTORS.*
Leonard Rosenblatt
Stanley Berger
*BY* Maxwell E. Sparrow
ATTORNEY.

United States Patent Office 3,037,088

Patented May 29, 1962

3,037,088

TAPE RECORDER TRANSPORT

Stanley Berger and Leonard Rosenblatt, Brooklyn, N.Y., assignors to Auricord Corporation, New York, N.Y.

Filed Jan. 6, 1961, Ser. No. 81,159

14 Claims. (Cl. 179—100.2)

This invention relates to tape recording machines, and particularly to tape transport devices in these types of machines.

The invention consists in such novel features, construction arrangements, combinations and improvements of parts as may be shown and described in connection with the apparatus herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

It is a general object of this invention to provide for contrivances for mechanically driving, transporting and controlling the tape in tape recording machines.

Another object of this invention is to achieve a perfect recording tape transport with a minimum of mechanical parts.

Furthermore, it is an object of the invention to provide for electrical means for controlling the tape transport for uniform, positive actuation.

Yet another object of the invention is to provide for separate, independently operated means for automatically lifting the tape off the recording or play-back heads of the recording apparatus when the tape is advanced or rewound at high speed.

Still another object of this invention is to provide for a jam-proof belt shifting mechanism for shifting from one tape speed to the other.

Various further and more specific objects, purposes, features and advantages will clearly appear from the detailed description given below in connection with the accompanying drawings which form part of this specification and illustrate merely by way of example one embodiment of the device of the invention. In the following description and in the claims, parts will be identified by specific names for convenience, but such names are intended to be as generic in their application to similar parts as the art will permit. Like reference characters denote like parts in the several figures of the drawings.

Figure 1:
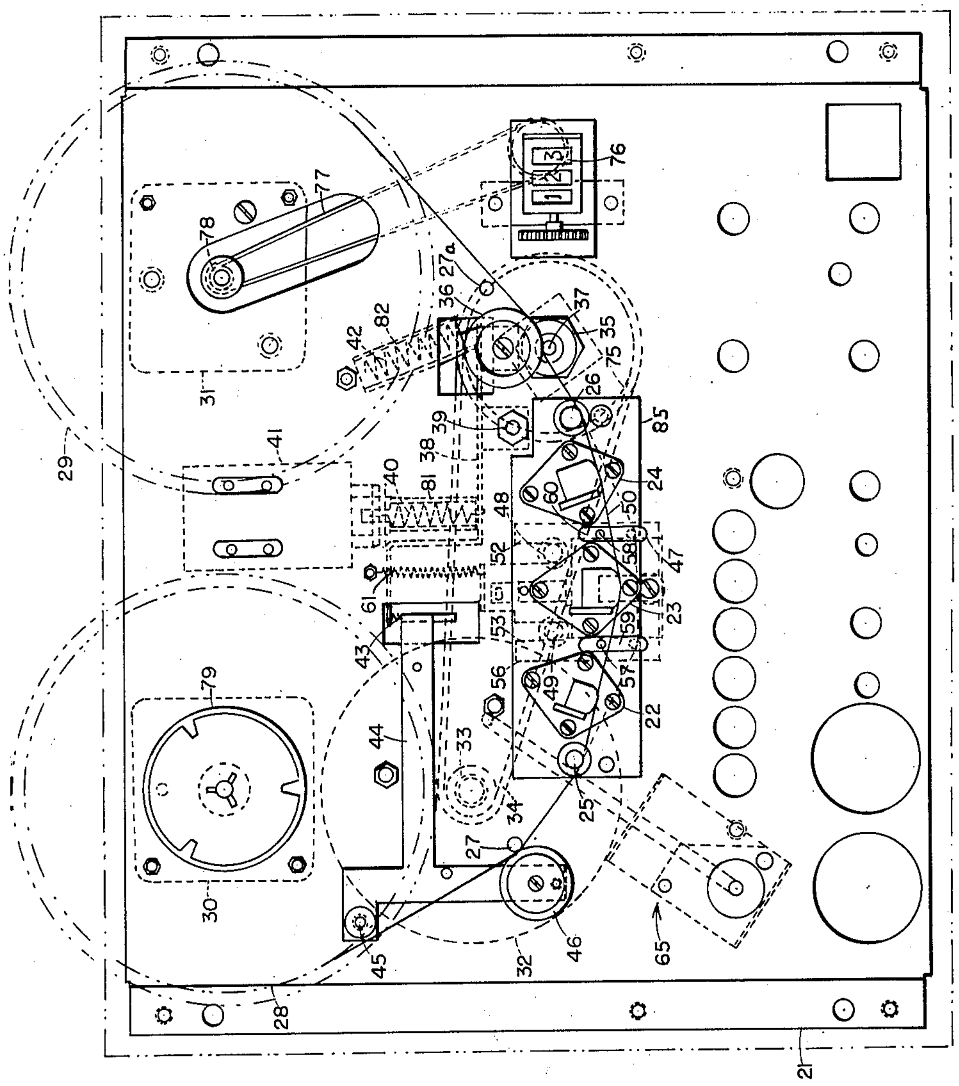
FIG. 1 is a top view of a tape recorder transport according to the invention.
Figure 2:
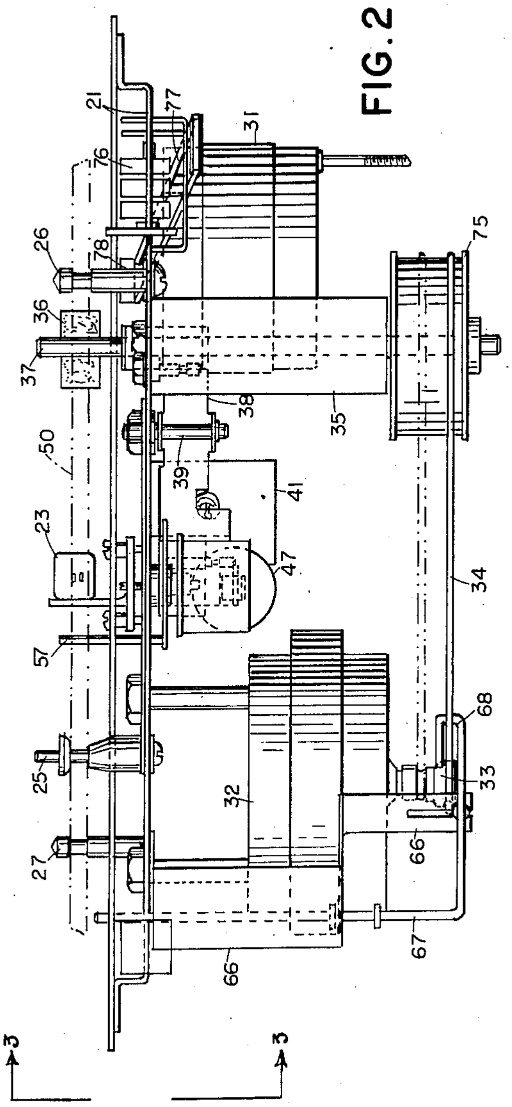
FIG. 2 is a front elevation of the transport shown in FIG. 1.
Figure 3:
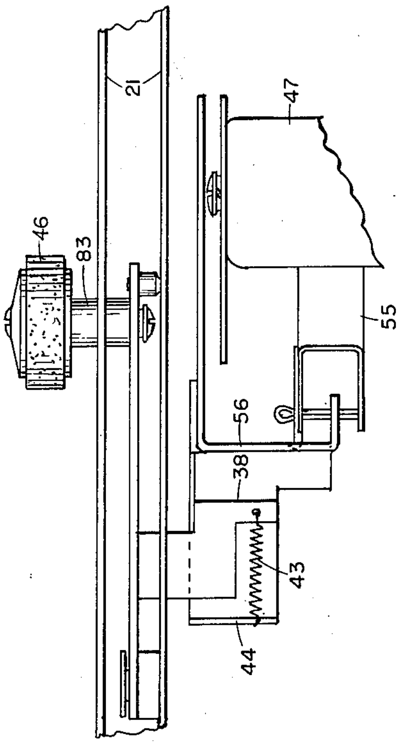
FIG. 3 is a detail view of a section of the transport, taken along the line 3—3 of FIG. 2, in a larger scale, partly broken away.
Figure 7:
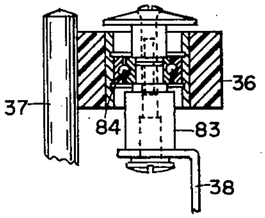
FIG. 7 is a vertical section of the pinch roller for the tape drive.

Referring now in more detail to the drawings illustrating a preferred embodiment by which the invention may be realized, there is shown in FIG. 1 a top view of the tape recorder mounting plate and parts, generally indicated by the numeral 21, also called a "tape deck." Three magnetic tape heads 22, 23, 24, representing a sound eraser head, a recording head and a play-back head, are mounted on the tape deck. Small guide posts 25, 26, 27 and **27*a* are provided for guiding the magnetic tape 50 over the heads and to and from the tape spools 28, 29. Each tape spool is directly driven by an electric motor 30, 31, mounted underneath the tape deck 21. A third electric motor 32 also is mounted underneath the tape deck 21 which drives by means of a pulley 33 and a rounded belt 34 the capstan generally indicated by the numeral 35. A pinch roller 36 is arranged opposite the capstan roller 37 for pressing the magnetic tape 50 against the latter, when the apparatus is set in motion. The pinch roller 36 is mounted on a pinch roller lever 38 by means of a stud 83 (FIG. 7), which lever is pivotally mounted on a stud 39. A precision instrument ball bearing 84 fitted inside the pinch roller 36 provides for a minimum of friction and for a maximum of accuracy in running. A spring 40 is fastened to one arm of the pinch roller lever 38. This spring 40 is pulled by a solenoid 41 by which action the pinch roller 36 presses the magnetic tape 50 against the driving capstan roller 37. The motion of the solenoid core is limited by sleeve 81 in which the spring 40 is located. The purpose of sleeve 81 is to preload spring 40 for load to be applied at the end of the solenoid stroke. On the other arm of the pinch roller lever 38 is a second, somewhat weaker spring 42, by which the pinch roller 36 is pulled back when the solenoid 41 is de-energized, thus releasing the tape drive and stopping the tape movement. A sleeve 82 is arranged with the spring 42 in the same manner as with the spring 40. Sleeve 82 limits movement of pinch roller 36**.

A third spring 43 is attached to an extension of the pinch roller lever 38, said spring being connected to the drag link 44. Drag link 44 is pivotally mounted on a stud 45 and carries on its other arm a felt drag member 46 which is pulled by the movement of the drag link 44 against the tape 50 passing over the guide post 27. Spring 43 applies load to tape 50 through felt drag member 46. This felt drag member 46 serves as a mechanical filter and at the same time acts by friction as a tape tensioning means.

Thus, when solenoid 41 is energized (FIG. 1 shows the energized position) pinch roller lever 38 is pulled by spring 40 against the weaker spring 42, and pinch roller 36 is pressed against the capstan roller 37. At the same time, drag link 44 is pulled by spring 43, swinging the felt drag member 46 against the guide post 27, the tape 50 now moving across the heads 22, 23, 24 under a uniform tension.

Figures 4, 5, 6:
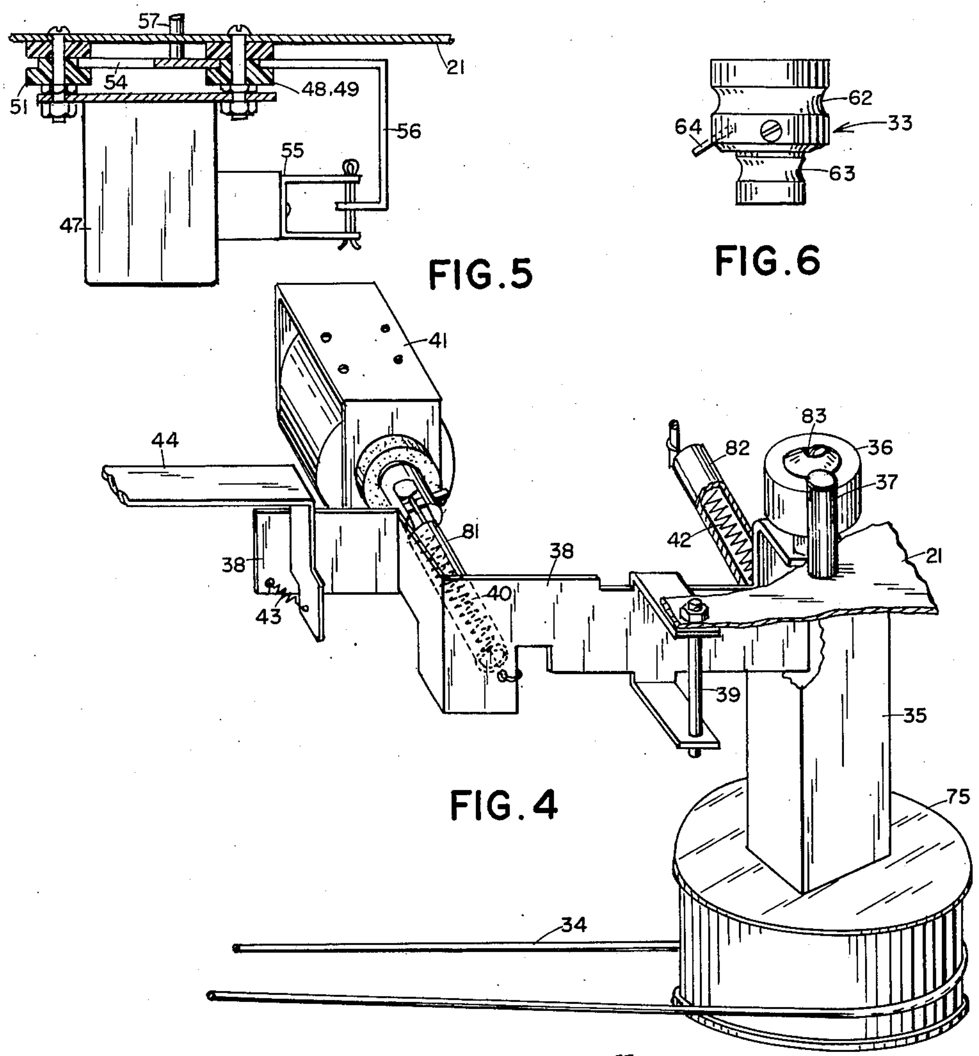
FIG. 4 is a perspective view of the drive control solenoid and of the drive capstan for driving the tape, partly broken away.
FIG. 5 is a side view of the tape-lifting solenoid and its mounting, the latter showing a section taken along the line 5—5 of FIG. 8.
FIG. 6 is a side view of the two-speed drive pulley, in reverse order, attached to the electric motor shaft for the capstan drive.
Figure 8:
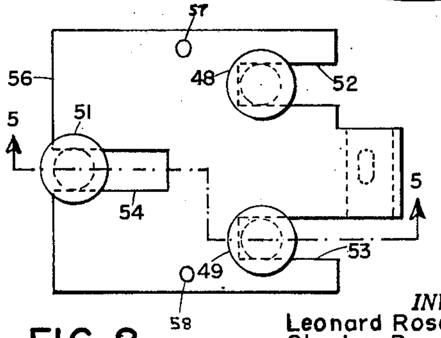
FIG. 8 is a top view of the linkage plate of the tape lifting solenoid.

A second solenoid 47 is arranged underneath the heads 22, 23, 24 and is secured by three guide posts 48, 49, 51 to deck 21. A gliding plate 56 having corresponding cut-outs 52, 53, 54 (FIGS. 5 and 8) is connected to the moving core 55 of the solenoid 47. The energized lifted position of tape lifters 57, 58 are established by the location of core 55 when fully seated in solenoid 47. The cut-outs 52 and 53 serve as means for limiting the stroke of the solenoid 47 in the other direction of operation in connection with the guide posts 48 and 49, and also establish the position of the tape lifters 57 and 58 in the de-energized position of solenoid 47. Tape lifters 57 and 58 are fastened to the gliding plate 56, extending through slots 59, 60 of the deck 21. Thus, when solenoid 47 is energized, core 55 pulls the gliding plate 56 forward, causing the tape lifters 57, 58 to lift the tape 50 away from the heads 22, 23, 24. This serves as a protection for the heads 22, 23, 24 from wear and performance deterioration, when the tape is moved fast forward or is rewound at high speed. The tape lifters work independently of the pinch roller 36 so that when cueing, that is, selecting a tape position from which to begin playing back, the tape is in contact with the heads although the pinch roller is pulled back. In this manner, the reels can be manually operated and the sound will play back through the heads, the exact positioning of the tape for starting a selection will be effected. In addition, if the tape lifters lifted the tape the moment the pinch roller was pulled back, a loop or slack would be found, since the reels have stopped and are not taking up any tape. Upon starting the reels, the take-up reel would turn quickly, there being no drag since the tape is not taut, resulting in interrupted tape movement or tape breakage when the slack in the tape is taken up and the reel is slowed suddenly by the drag of the now taut tape. A spring 61 is attached to the gliding plate 56 providing for the return stroke of the solenoid 47 and inactive position of tape lifters 57 and 58.

Figures 9, 10:
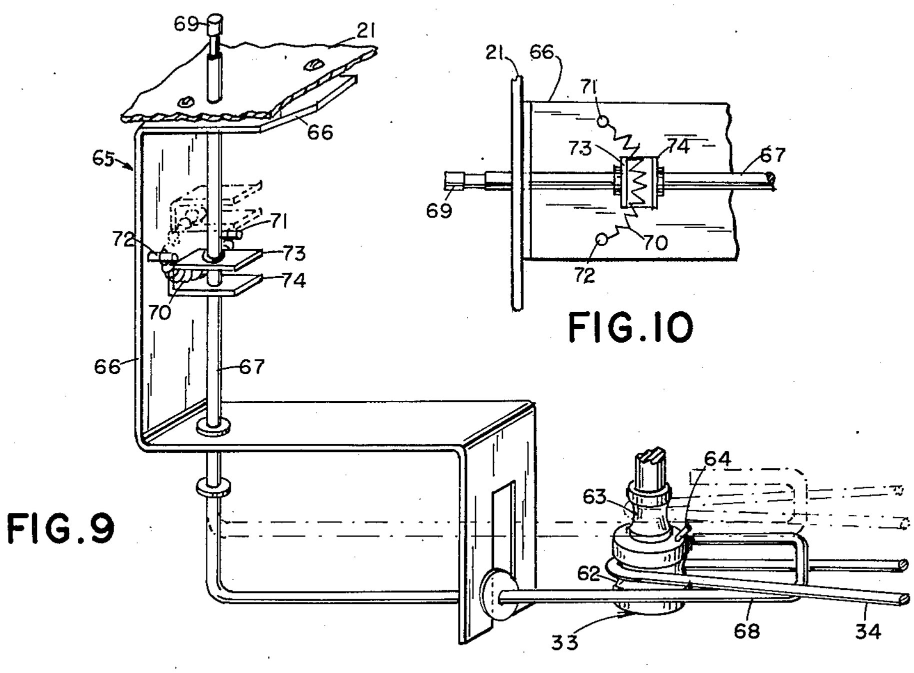
FIG. 9 is, in perspective, a view of the speed changing device for the capstan drive.
FIG. 10 shows a detail of FIG. 9, illustrating toggle means for holding the speed changing device in either position.
Figure 11:
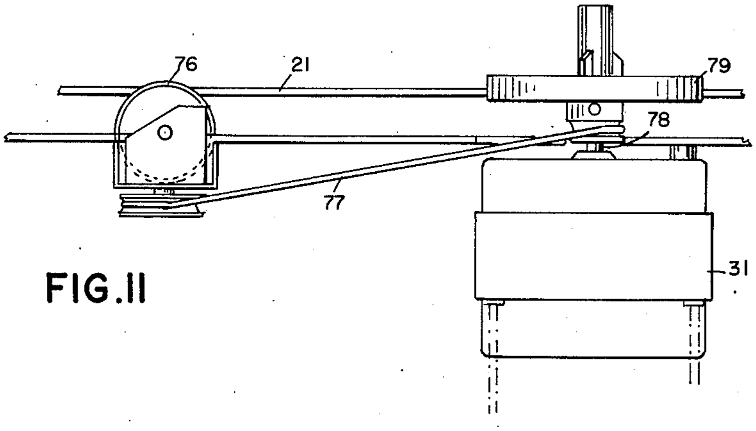
FIG. 11 is a detail view of the counter drive.

The capstan roller 37 is driven by belt 34, as described above. The pulley 33 has two grooves 62, 63 of different diameters (FIG. 6) for a two-speed drive of the capstan roller 37. A speed changer 65 (FIG. 1) is provided for manual operation from the top of the deck 21. This speed changer 65 is illustrated in more detail in FIGS. 9 and 10. In a bracket 66 is a rod 67 glidingly located. Rod 67 is bent in a U-shape at its lower end 68, thus embracing belt 34. The upper end 69 extends through the deck 21 for operation. A compression spring 70, held between two stationary posts 71, 72 on the bracket 66 and between two brackets 73, 74 which are fastened to the rod 67, serve as toggle members for holding the rod in its upper position and in its lower position, respectively. When the belt 34 is running on the smaller diameter groove 63 of the pulley 33 and the rod 67 is pushed downwardly for changing the speed of the capstan roller 37, the U-shaped lower end 68 urges belt 34 downwardly until a pin 64 on the pulley catches the belt and guides it into the groove 62. Similarly the speed is changed in the opposite sense by pushing the rod 67 upwardly. In order to stabilize the speed, the capstan 35 has a heavy, dynamically balanced flywheel 75.

Figure 12:
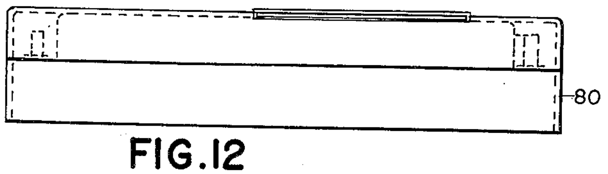
FIG. 12 is a front view of the cover for the recording heads shown in FIG. 1.
Figure 13:
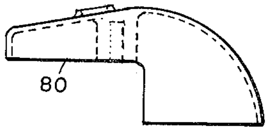
FIG. 13 is a side elevation of the cover shown in FIG. 12.
Figure 14:
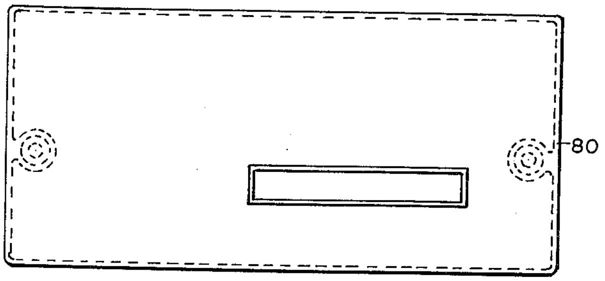
FIG. 14 is a top view of the cover shown in FIG. 12.
Figure 15:
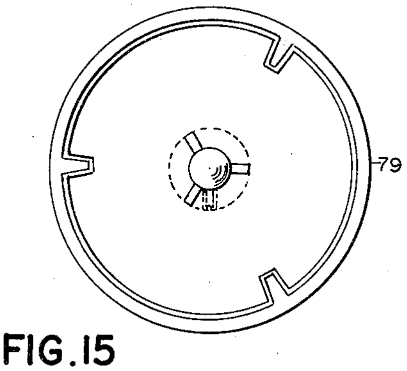
FIG. 15 is a top view of a tape winding hub.
Figure 16:
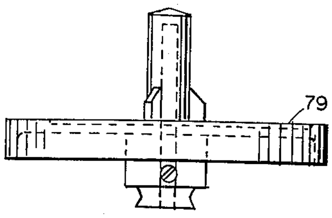
FIG. 16 is the side elevation of the tape winding hub shown in FIG. 15.

A counting device 76 which is directly driven by belt 77 from shaft 78 of motor 31 of the tape spool 29, is located on top of the deck 21. Also attached to shaft 78 of motor 31 is a tape reel drive hub 79, a second one being attached to the shaft of motor 30 (FIGS. 15 and 16). A plastic cover 80 (FIGS. 12–14) encloses the heads 22, 23, 24 in order to protect them from dust or from being damaged.

Plate 85 upon which the heads 22, 23 and 24 are mounted permits easy removal of the head assemblies and further permits separate head alignments or head exchanges. Plate 85 has the critical tape height guides 25, 26 upon which the head alignments are based.

It is understood that the tape transport may be used for play-back, recording or in combination.

The operation of this tape recorder transport is cut down to two solenoid controls and the construction is much simplified, providing for a uniform positive performance with less wear and deterioration of the tape and of the heads.

The conventional magnetic tape used for recording has an oxide coating on one surface. During the operation of the device, this coating is deposited on the drag roller 46 which is covered with such material as felt or the like. When the oxide that is deposited reaches an appreciable amount, the friction between the drag roller and the tape is reduced, thereby causing slippage. In order to avoid this result, the drag roller is arranged so that it may be rotated when the deposit reaches an objectionable amount to thus present a clean surface at the point of contact between the tape and the drag roller.

While the invention has been described and illustrated with respect to a certain particular preferred example which gives satisfactory results, it will be understood by those skilled in the art after understanding the principle of the invention, that various other changes and modifications may be made without departing from the spirit and scope of the invention, and it is intended therefore in the appended claims to cover all such changes and modifications.

We claim:

1. In a magnetic tape transport having a mounting plate, two driven tape spooling means mounted thereon, at least one magnetic head, magnetic tape adapted to travel from one tape spooling means to the other tape spooling means in intimate association with said magnetic head, a driven capstan arranged in the path of said tape, and a plurality of tape guiding means arranged on said plate; a spring loaded pinch roller for operatively engaging said tape and said capstan for frictionally driving said tape, a spring loaded brake member for keeping said tape under uniform tension, said brake member operated simultaneously with said roller against one of said plurality of tape guiding means, and tape lifters for moving said tape away from said magnetic head, said tape lifters comprising means for being operated independently from said roller and said brake member.

2. In a magnetic tape transport, according to claim 1, wherein said magnetic head is mounted on a removable plate member separately mounted on said plate, said plate member containing critical tape height guides.

3. In a magnetic tape transport having a mounting plate, two electrically driven tape spooling means mounted on said plate, a plurality of magnetic heads, magnetic tape adapted to travel from one tape spooling means to the other tape spooling means in intimate association with said magnetic heads, a capstan arranged in the path of said tape, said capstan driven independently of the tape spooling means, and a plurality of tape guiding posts arranged on said plate; a first lever pivotally mounted on said plate, a first solenoid, at least two springs on said lever for operating said lever, one of said two springs operatively connected with said solenoid, a pinch roller arranged on said lever for operatively engaging said tape and said capstan for frictionally driving said tape, a second lever pivotally mounted on said plate, said second lever having a spring yieldingly connecting said second lever with said first lever and having a brake member for frictionally engaging said tape with one of said plurality of guide posts for keeping said tape under uniform tension at the same time when said pinch roller operatively engages said tape for driving the latter, a second solenoid operated independently from said first solenoid, said second solenoid having a core, a spring-loaded operating plate connected with said core, and tape lifters attached to said operating plate for moving said tape away from said magnetic head.

4. In a magnetic tape transport having a mounting plate, spooling means, at least one magnetic head on said plate, magnetic tape operated by said spooling means in intimate association with said magnetic head, a capstan arranged in the path of said tape, and guiding posts arranged on said plate; a first lever pivotally mounted on said plate, a first solenoid, said lever being spring operated, springs operatively connected with said solenoid, a pinch roller arranged on said lever, said roller located on said lever for operatively engaging said tape and said capstan for frictionally driving said tape, a second lever pivotally mounted on said plate and yieldingly connecting said second lever, said second lever having a brake member for frictionally engaging said tape with one of said guide posts for keeping said tape under uniform tension at the same time when said pinch roller operatively engages said tape for driving the latter, a second solenoid, a spring-loaded operating plate connected with said solenoid, and means attached to said operating plate for moving said tape away from said magnetic head.

5. In a magnetic tape transport, according to claim 4, and having a two-speed driving means for said capstan, and manually operated speed shifting means.

6. In a magnetic tape transport, according to claim 4, and having tape length counting means, said counting means comprising means for being driven by one of said spooling means.

7. In a magnetic tape transport, according to claim 4, and having a two-speed driving means for said capstan, manually operated speed shifting means, and tape length counting means, said counting means comprising means for being driven by one of said spooling means.

8. In a magnetic tape transport having a mounting plate, two magnetic tape spooling means mounted on said plate, at least one magnetic head, magnetic tape adapted to travel from one tape spooling means to the other tape spooling means in intimate association with said head, capstan drive means arranged in the path of said tape, and tape guiding means arranged on said plate; first means for pinching said tape against said capstan drive for frictionally driving said tape, second means simultaneously operated with said first means, said second means having means for frictionally keeping said tape under uniform tension, a solenoid having a core, a spring-loaded operating plate connected with said core and means attached to said operating plate for moving said recording tape away from said head.

9. In a magnetic tape transport having a mounting plate, two driven tape spooling means mounted thereon, at least one magnetic head, magnetic tape adapted to travel from one tape spooling means to the other tape spooling means in intimate association with said magnetic head, a driven capstan arranged in the path of said tape, and a plurality of tape guiding means arranged on said plate; a spring-loaded pinch roller for operatively engaging said tape and said capstan for frictionally driving said tape, a spring-loaded brake member for keeping said tape under uniform tension, said brake member operated simultaneously with said roller against one of said plurality of tape guiding means, a solenoid having a core, a spring-loaded operating plate connected with said core and means attached to said operating plate for moving said recording tape away from said head.

10. In a magnetic tape transport according to claim 4, wherein said capstan is driven independently of said spooling means, and wherein said first solenoid is operated independently from said second solenoid.

11. In a magnetic tape transport, according to claim 8, wherein said means for frictionally keeping said tape under uniform tension comprises a manually rotatable cylindrical head having a frictional surface.

12. In a magnetic tape transport, according to claim 9, wherein said brake member comprises a manually rotatable cylindrical head having a frictional surface.

13. In a magnetic tape transport, according to claim 4, wherein said brake member comprises a manually rotatable cylindrical head having a frictional surface.

14. In a magnetic tape transport, according to claim 4, wherein said magnetic head is mounted on a removable plate member separately mounted on said plate, said plate member containing critical tape height guides.

References Cited in the file of this patent

UNITED STATES PATENTS

| | | |
|---|---|---|
| 2,595,197 | Kuhlow | Apr. 29, 1952 |
| 2,743,319 | Thompson | Apr. 24, 1956 |
| 2,845,495 | Lyon | July 29, 1958 |